United States Patent
Ishikawa et al.

(10) Patent No.: US 6,332,790 B1
(45) Date of Patent: Dec. 25, 2001

(54) CARD CONNECTOR

(75) Inventors: Yasuhiro Ishikawa; Masao Suzuki; Hideo Tadokoro, all of Sagamihara; Seiya Amatatsu; Atsushi Nakanishi, both of Tokyo, all of (JP)

(73) Assignees: Union Machinery Co., Ltd., Kanagawa; Sony Corporation, Ltd., Tokyo, both of (JP)

( * ) Notice: Subject to any disclaimer, the term of this patent is extended or adjusted under 35 U.S.C. 154(b) by 0 days.

(21) Appl. No.: 09/739,115

(22) Filed: Dec. 19, 2000

(30) Foreign Application Priority Data

Dec. 27, 1999 (JP) .................................................. 11-370397

(51) Int. Cl.$^7$ .................................................. H01R 13/62
(52) U.S. Cl. .......................................... 439/157; 439/159
(58) Field of Search .................................. 439/157, 159, 439/153, 328, 325, 152, 155

(56) References Cited

U.S. PATENT DOCUMENTS

| | | | |
|---|---|---|---|
| 5,051,101 | * 9/1991 | Komatsu | 439/159 |
| 5,848,906 | * 12/1998 | Gluisker et al. | 439/157 |
| 6,270,365 | * 8/2001 | Nishioka | 439/159 |

FOREIGN PATENT DOCUMENTS 11135192   5/1999   (JP) .

OTHER PUBLICATIONS

English Language Abstract of JP 11-135192.

* cited by examiner

Primary Examiner—Tho D. Ta
(74) Attorney, Agent, or Firm—Greenblum & Bernstein, P.L.C.

(57) ABSTRACT

A card connector 1 comprising a card member 3 having card-side terminals 9 on the leading edge thereof, a card holding member 5 which has mother-apparatus-side terminals on the leading edge thereof and which the card member 3 can be inserted in and extracted from, and a slider 7 which slides inside the card holding member 5 along with the insertion and extraction of the card member 3. An oscillating member 27 which can oscillate freely is provided in the slider 7, an engaging protrusion 29 which engages with the engaging indention on the card member 3 is formed in the mid section of the oscillating member 27, and a cam protrusion 31 is provided at the tip of the oscillating member 27. A cam groove 19 is provided on the inside side wall of the card holding member 5 in opposition to the tip of the cam protrusion 31. By means of the cam mechanism consisting of the cam protrusion 31 and the cam grove 19, the card member 3 is held in the card holding member 5 in the state where the card-side terminals 9 are in contact with the mother-apparatus-side terminals 17 as a result of the card member 3 being pushed into the card holding member 5, and the card member 3 is positioned and held in the position where it can be inserted in and extracted from the card holding member 5.

6 Claims, 7 Drawing Sheets

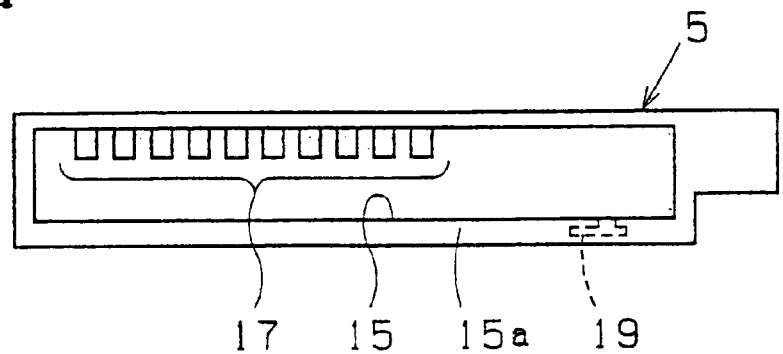
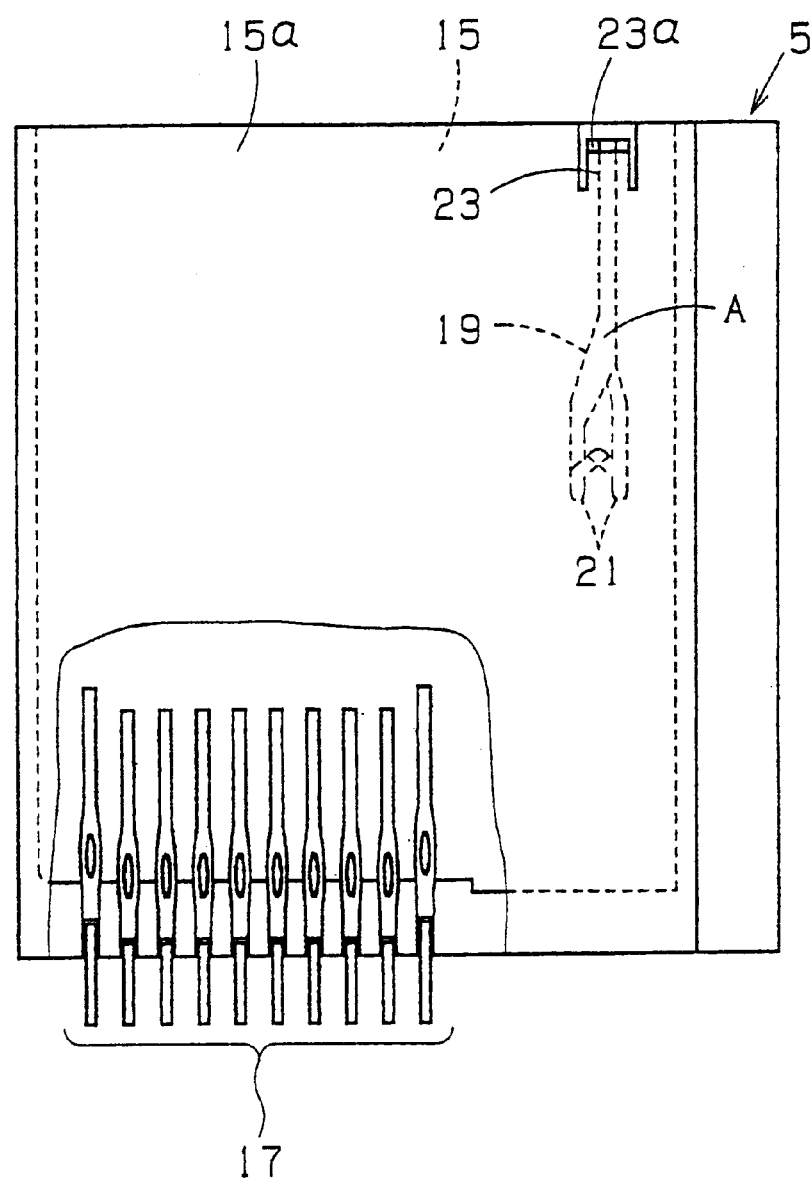

CARD CONNECTOR

RELATED APPLICATIONS

This application claims the priority of Japanese Patent Application No. 11-370397 filed on Dec. 27, 1999, which is incorporated herein by reference.

FIELD OF THE INVENTION

The present invention relates to a card connector, and more particularly to a card connector consisting of a card member having terminals on the leading edge thereof and a card holding member that has connecting terminals on the leading edge thereof, and holds the card member such that the card member can be inserted in and withdrawn from the card holding member, and the card connector is constructed such that it holds the card member when the card member is inserted into the card holding member with the connecting terminals being in contact with the aforementioned terminals, establishing an electrical connection between the connecting terminals and the card member.

BACKGROUND OF THE INVENTION

Card connectors in which a card member such as memory card having card-side terminals at the leading edge thereof is inserted in a card holding member having mother-apparatus-side terminals so that the card member is held by the card holding device with the card-side terminals being in contact with the mother-apparatus-side terminals have been previously disclosed in Japanese Laid-Open Patent Application No.11-135192 for example. The card connector disclosed therein consists of a plate-like card member, a card holding member having mother-apparatus-side terminals on one edge and an opening on the other edge to provide a bottomed rectangular space, and a slider that is situated on one of side walls in the width-wise direction within the card holding member and slides along with the insertion and withdrawal of the card member into and out of the card holding member.

The slider, having a right-angled parallelepiped shape, is equipped with engaging protrusions on the card member side face thereof which engage with the engaging indention formed on the side of the card member. For this configuration, when the card member is inserted into the card holding member, the protrusions on the slider and the indention on the card member engage with one another and the card member thereby can be engaged with the slider.

Moreover, the slider is provided with a cam groove in the side face opposite the side face on the card member side. The cam groove constitutes a cam mechanism together with the cam protrusions formed on the internal wall of the card holding member opposing the slider's side face on which the came groove is formed. The cam mechanism has a function of positioning and holding the card member, according to the push-in operation of the card member, either in a contact position where the card member held by the card holding member with the card-side terminals being in contact with the mother-apparatus-side terminals or in a insertion/extraction position where the card member can be inserted in or extracted from the card holding member.

Therefore, when pushing the card member into the card holding member in order to seat the card member in the card holding member, the card member is retained in the contact position by the cam mechanism, or the card member is held by the card holding member with the card-side terminals being in contact with the mother-apparatus-side terminals.

Furthermore, when the card member in the contact position is pushed inside the card holding member in order to extract the card member from the card holding member, the cam mechanism moves the card member to the insertion/extraction allowing position and holds it there to establish a situation under which the card member can be extracted from the card holding member.

With this construction, as the cam protrusions of the cam mechanism are provided on the internal wall of the card holding member opposing the side face of the slider, the width of the card connector determined to accommodate the width of the card member is enlarged and the number of assembly steps are also increased.

In this construction, to facilitate the insertion of the card member in the slider, the engaging protrusions provided on the slider are formed in the semicircular shape (round shape) and the slider is pushed against the card holding member by a spring biased to the side of the opening of the card holding member. Therefore, when the card member is pushed in and then the hand is removed from the card member for extracting the card member, the slider moves under the force of the spring to the side of the opening of the card holding member and stops at the insertion/extraction allowing position. However, in the insertion/extraction allowing position, the force is exerted from the engaging indentions of the card member to the engaging protrusions in the direction to release the engaging protrusions from the engagement, and the slider moves in the direction in which the protrusions disengage from the indentions, which results in a forceful expulsion of the card member from the card holding member.

SUMMARY OF THE INVENTION

An object of the present invention is to provide a card connector having a miniaturized width dimension and shape.

A further object of the invention is to provide a card connector having an engaging mechanism which does not cause the card member to spring out of the card holding member when removing the card member.

The card connector according to the present invention comprises a card member having card-side terminals; a card holding member which has mother-apparatus-side terminals to be connected with the card-side terminals, is capable of accommodating the card member such that the card member can be inserted therein and extracted therefrom, and is constructed such that, when the card member is seated inside the card holding member, the mother-apparatus-side terminals are in contact with the card-side terminals to establish an electrical connection therebetween; a slider which is installed in the card holding member so as to be movable in the direction of insertion and extraction of the card member and which moves in the direction of insertion and extraction along with the insertion and extraction of the card member; an engaging mechanism which is provided between the slider and the card member for engaging the card member with the slider; and a cam mechanism which is provided between the slider and the card holding member, and which, in response to the operation of pushing in the card member, positions and holds the slider in the contact position where the card member is held by the card holding member with the card-side terminals being in contact with the mother-apparatus-side terminals, and in the insertion/withdrawal allowing position where the card member can be inserted into or extracted from the card holding member.

The cam mechanism is composed of a cam protrusion that protrudes from a cam member provided in the slider and of a cam groove that is formed on the internal wall of the card holding member in opposition to the cam protrusion so as to hold the card member in the contact position and in the insertion/withdrawal allowing position. On the other hand, the engaging mechanism is composed of an engaging protrusion provided in the slider and of an engaging indention formed on the wall face of the card member in opposition to the engaging protrusion so as to engage with the engaging protrusion.

With a card connector of the above-mentioned construction, when the card member is pushed into the card holding member in order to seat the card member in the card holding member, along with the slider moving toward the leading edge of the card holding member, the protrusions on the slider engage with the indention on the card member, whereby the card member is engaged with the slider. Furthermore, the cam protrusion of the cam mechanism provided on the slider moves while being guided by the cam groove and the card member is held in the card holding member in the contact position. Specifically, the card member is held in the card holding member in a state where the card-side terminals are in contact with the mother-apparatus-side terminals to establish an electrical connection between the mother-apparatus-side terminals and the card member.

In order to extract the card member held in the contact position from the card holding member, a push-in operation is performed on the card member. When the push-in operation is performed, the cam mechanism moves the card member to and hold the same in the insertion/extraction allowing position where the card member can either be inserted or extracted. Then, when a card member extraction operation is performed, the engagement between the card member and the slider through the engaging mechanism is released, and the card member is extracted from the card holding member.

As seen from the above, by locating the cam protrusion for the cam mechanism on the slider and by locating the cam groove for the cam mechanism on the internal wall of the card holding member, the dimensional width of the connector in relation to the width of the card member can be made smaller and the over all size of the card connector can be reduced in comparison to the conventional card connectors having the cam protrusions on the card holding member.

Further, with card connectors of the above construction, it is preferable that the cam member consists of an oscillating member, one end of which is connected to the inside of the slider in a manner allowing free rotation, while the other end of which is free to oscillate in the direction of the thickness and width of the card holding member. It is also preferable that the oscillating end of the oscillating member forms the cam protrusion while the mid section of the oscillating member forms the engaging protrusion.

With the card connector of the above construction, when a card member is pushed into the card holding member, the engaging protrusion of the oscillating member provided on the slider engages with the engaging indention so that the card member is engaged with the slider, and at the same time the cam protrusion moves along the cam groove so that the cam mechanism positions and holds the card member in the contact position and in the insertion/extraction allowing position.

By providing the oscillating member provided in the slider with the cam protrusion constituting part of the cam mechanism and with the engagement protrusion constituting part of the engaging mechanism, the assembly efficiency of the card connector can be improved compared to conventional art which provides the engagement protrusion and the cam protrusion separately.

Moreover, in the card connector with the above construction, it is preferred that the engagement protrusion is shaped such that, of the force acting when the card member is moved in the extracting direction and the internal wall face of the engaging indention abuts against the engaging protrusion, the magnitude of the force acting in the direction to disengage the engaging protrusion from the engaging indention is smaller than the force acting in the direction to extract the card member.

With card connectors constructed in the above manner, when the hand is removed from the card member after pushing the card member in during the card member extracting operation, the slider moves towards the opening and stops at the insertion/extraction allowing position. At this point, there is a force acting on the engaging protrusion from the internal wall face of the engaging indention on the card member, and, of this force, the magnitude of the force acting in the direction to disengage the engaging protrusion from the engaging indention is smaller than the magnitude of the force acting in the direction to extract the card member. Therefore, the amount of movement of the engaging protrusion in the direction away from the engaging indention is small, and the card member is held in a state where the card member is engaged with the slider in the insertion/extraction allowing position.

As explained above, by shaping the engagement protrusion such that, of the force acting when the internal wall face of the engaging indention abuts against the engaging protrusion after being moved in the direction in which the card member is extracted, the magnitude of the force acting in the direction to disengage the engaging protrusion from the engaging indention is smaller than the magnitude of the force acting in the direction to extract the card member, the card member in the insertion/extraction allowing position can be prevented from plunging out of the holding member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIGS. 2a and 2b show the card holding member according to an embodiment of the invention, wherein both FIG. 2a is a front view and FIG. 2b is a plan view of the card holding member;

FIG. 3c is a cross-sectional view of the portion as indicated by the arrows II—II in FIGS. 3a, and FIG. 3d is a cross-sectional view of the portion as indicated by the arrows III—III in FIG. 3a;

DESCRIPTION OF THE PREFERRED EMBODIMENTS

The following is an explanation of the preferred embodiments of the invention in reference to FIG. 1 through FIG. 7. These figures show a card connector in which a card member such as a memory card or the like having card-side terminals is inserted in and held by a card holding member having mother-apparatus-side terminals in a state where the card-side terminals are in contact with the mother-apparatus-side terminals.

Figure 1:
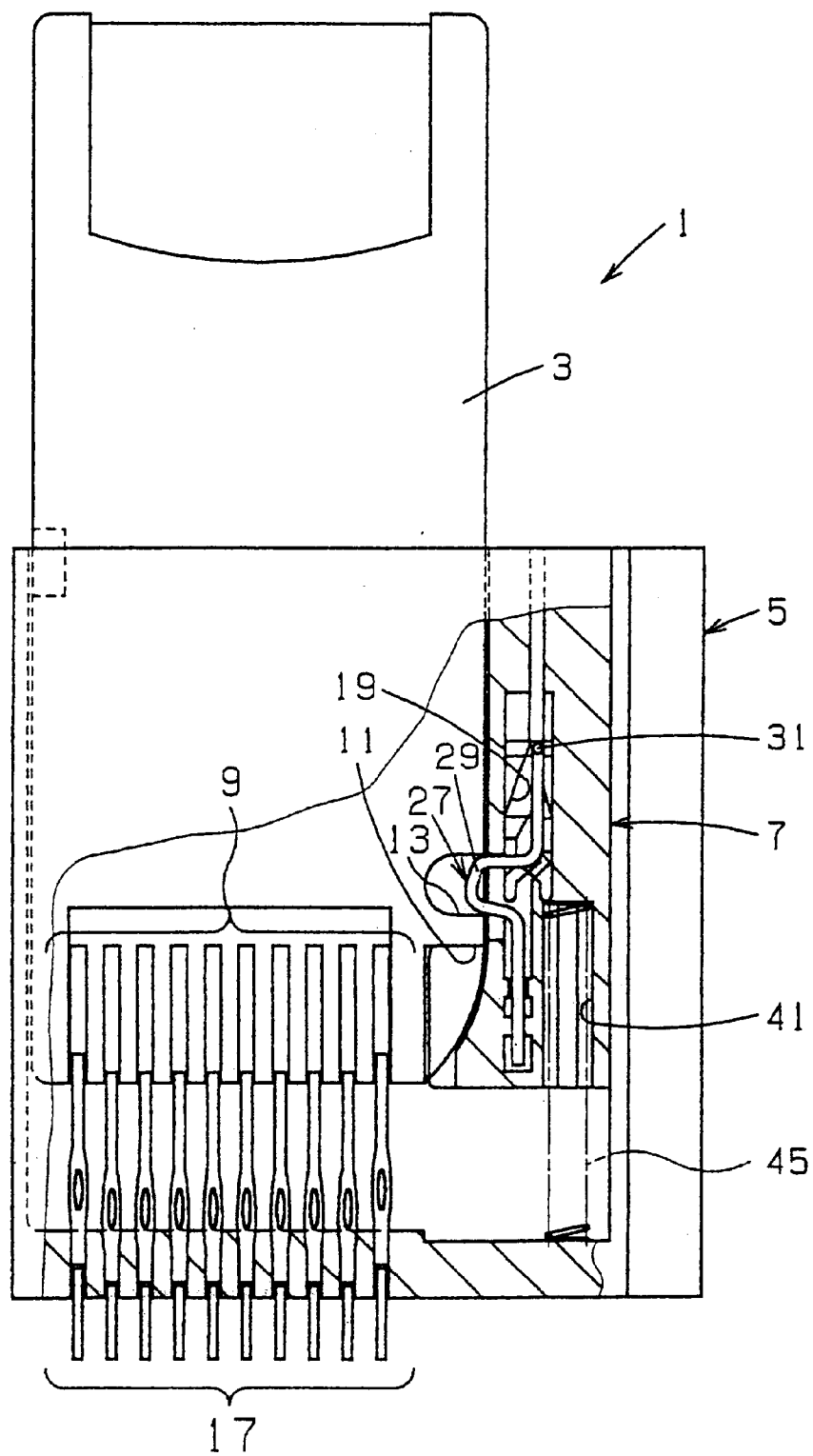
FIG. 1 is a plan view showing a card connector according to an embodiment of the invention.

The card connector 1, as shown in FIG. 1, comprises a card member 3, a card holding member 5 allowing insertion and extraction of the card member 3, and a slider 7 which is located on the right side wall in the width-wise direction (in the lateral direction in FIG. 1) of the card holding member 5 and which slides up and down along with the insertion and extraction of the card member into and out of the card holding member 5.

The card member 3 is in the form of a plate and has, on the leading edge thereof (on the lower side in FIG. 1), a plurality of card-side terminals 9 which are arrayed in the lateral direction at specific intervals. A rectangular step 11 is provided on the right side edge of the front part of the card member 3. The outside of the step 11 is formed in the shape of a circular arc gradually inclining towards the inside of the step as approaching the leading edge of the card member 3. An engaging indention 13 with an arc shaped front end is provided in the card member 3 on the rear side with respect to the step 11. As shown in FIG. 2a and FIG. 2b, the card holding member 5 has an opening 15 in the upper portion thereof to define a bottomed rectangular space. On the left side of the bottom edge of the camber, are provided a plurality of mother-apparatus-terminals 17 to be connected with the card-side terminals 9, arrayed in the lateral direction at specific intervals as shown in the diagram. The cam groove 19 is provided in the inside of the right upper portion of the side wall 15a on the front side of the card holding member 5.

Figure 3A:
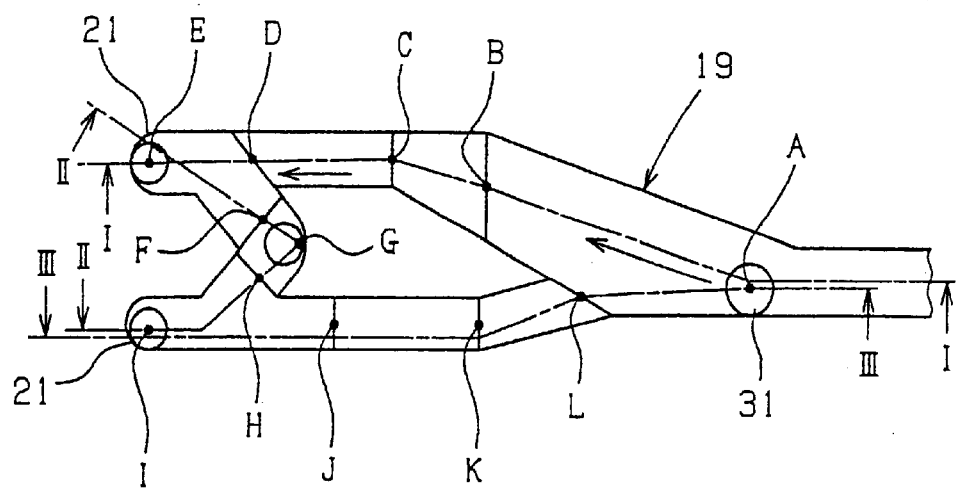
FIG. 3a is a plan view of the cam grove for a card connector according to an embodiment of the invention.

The cam groove has two protrusions 21 which come together at the back side and extend towards the opening 15 to form a so-called heart-shape cam. FIG. 3a shows a plan view of the cam groove 19, FIG. 3b is a cross-sectional view of the portion as indicated by the arrows I—I in FIG. 3a, FIG. 3c is a cross-sectional view of the portion as indicated by the arrows II—II in FIG. 3a, and FIG. 3d is a cross-sectional view of the portion as indicated by the arrows III—III in FIG. 3a.

Figure 3B:
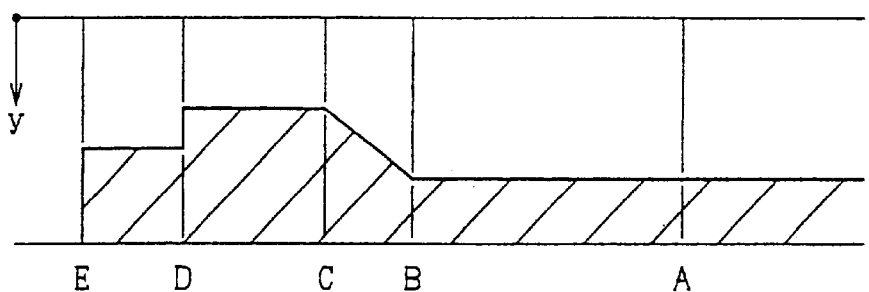
FIG. 3b is a cross-sectional view of the portion as indicated by the arrows I—I.

As shown in FIGS. 3a and FIG. 3b, the cam groove 19 defines a flat plane with a uniform depth of y in the section from point A to point B; an upward slanting slanted plane in the section from point B to point C where the depth y of the cam groove 19 gradually decreases towards point C; a flat plane having the same depth y as the depth at point C in the section from point C to point D; and a step in the section from point D to point E, where the depth of the cam groove 19 is greater than the depth at point C.

Figure 3C:
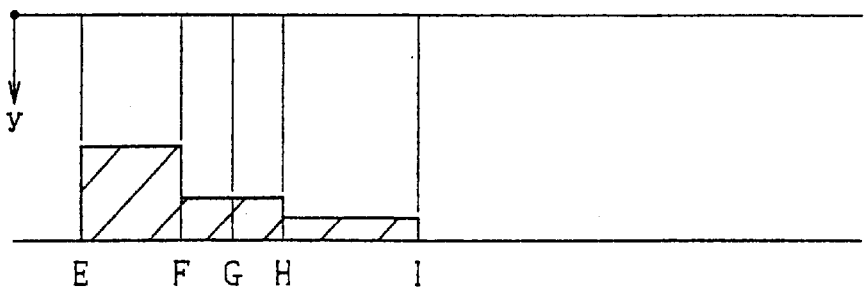

Furthermore, as shown in FIG. 3c, the cam groove 19 defines, in the section from point E to point F, a plane having the same depth y as the depth of the section from point D to point E; and a step in the section from point F to point H where the depth y of the cam groove 19 is deeper than the depth of the section between points D and F. In the section from point H to point I, the cam groove 19 defines a step where the depth y thereof is deeper than the depth of the section between points F and H.

Figure 3D:
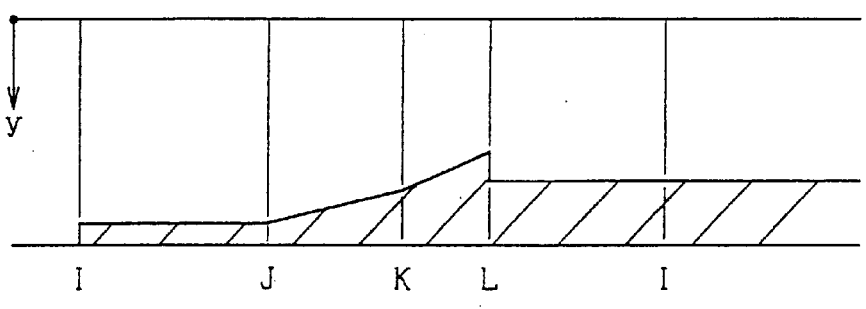

Moreover, as shown in FIG. 3d, the cam groove 19 defines, in the section from point I to point J, a plane which is coplanar with the plane in the section between points H and I, and defines in the section from point J to point L an upward slanting plane, where the depth y of the cam groove 19 gradually becomes shallower towards point L, and point L is located on the upper level than point A. Therefore, the step is formed closer to the point A than to the point L. In FIG. 2b, the groove extends upwards from point A, having the same depth as the point A. In the upper part of the side wall 15a on the front side of the card holding member 5, is provided an a catch 23 which has a catching protrusion 23a in the inside thereof and is elastically deformable in the direction of the thickness of the card holding member 5.

Figure 4C:
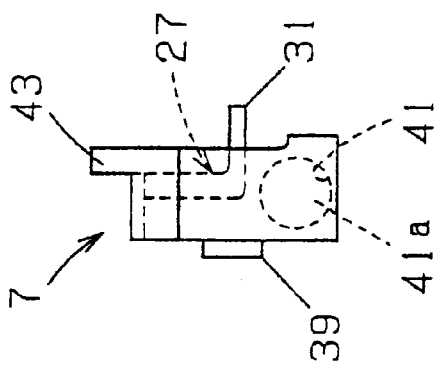
FIG. 4b is a plan view of the slider and FIG. 4c is a right side view of the slider.
Figure 4B:
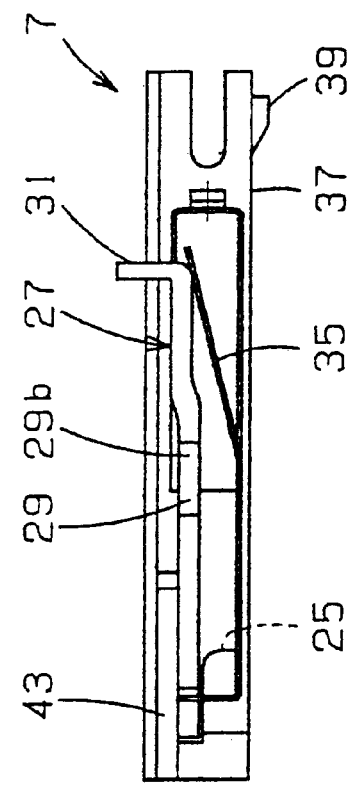
Figure 4A:
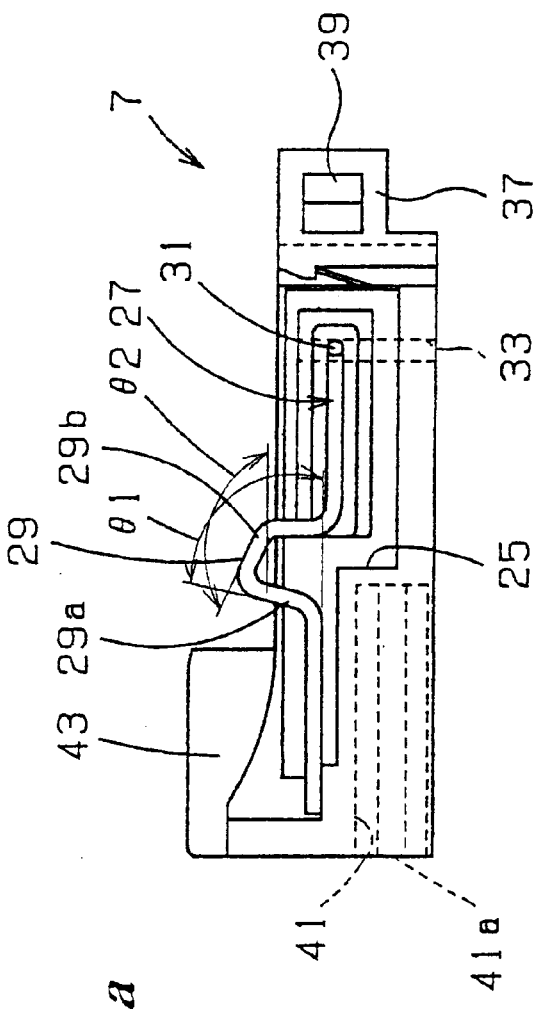
FIG. 4a is a plan view of a slider of the card holding member according to an embodiment of the invention.
Figure 5:
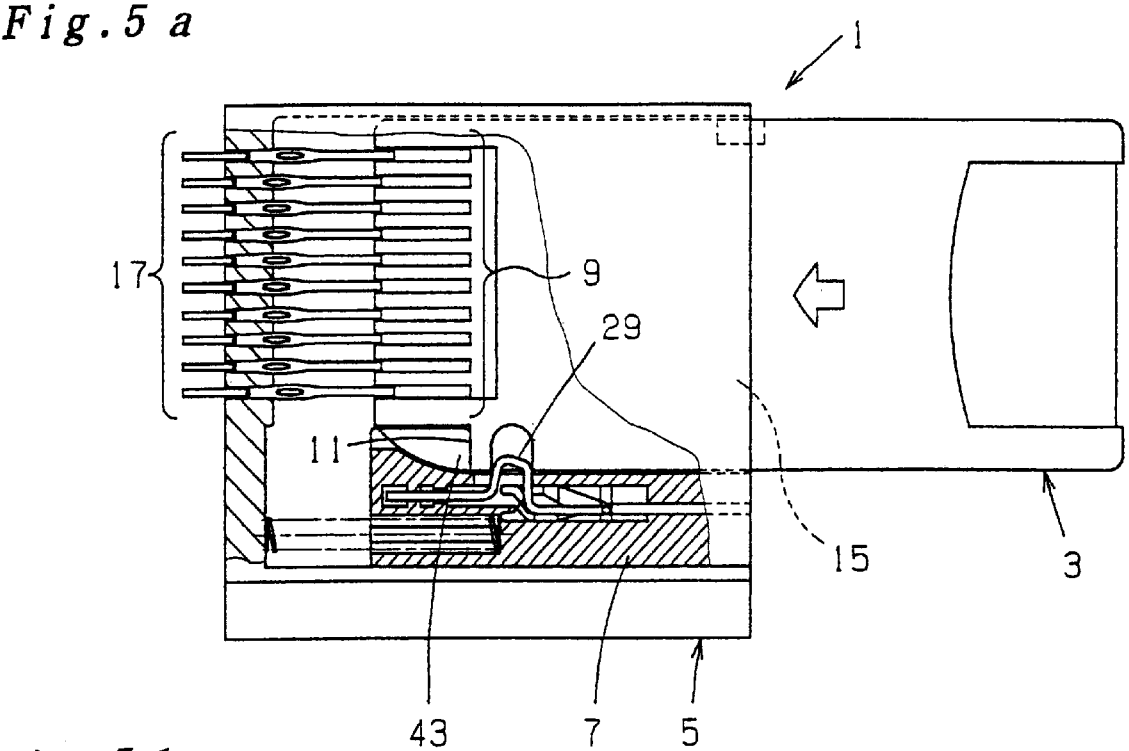
FIGS. 5a and 5b are diagrams for explaining the actions of the card connector according to an embodiment of the invention.
Figure 5:
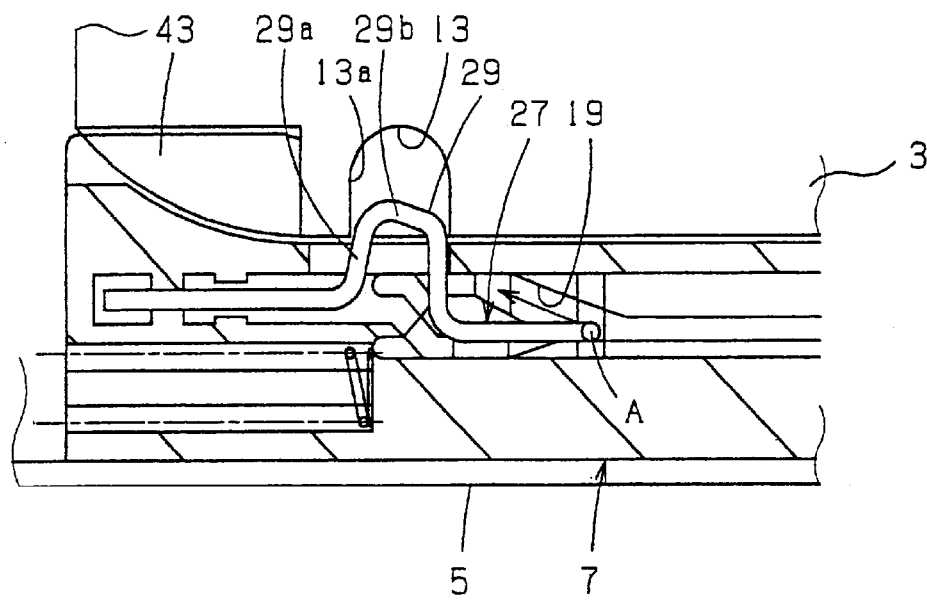

As seen in FIG. 4, the slider 7 has a substantially rectangular parallelepiped shape. In FIG. 4A, a step 25 extending in the lateral direction is formed in the mid section of the slider 7. A bar shaped oscillating member 27 is connected to the left-hand end of the step 25 in a manner allowing the left-hand end thereof to freely oscillate in the vertical and horizontal directions. The right-side end of the oscillating member 27 extends substantially in the same direction as the slider 7 extends. An upwardly curved engaging protrusion 29 is provided on the mid section of the oscillating member 27. The engaging protrusion 29 has a rectangular shape, and the angle θ1 made between the left-side protruding piece 29a of the engaging protrusion 29 and the extending direction of the base of the oscillating member 27 is an obtuse angle.

Furthermore, the magnitude of angle θ1 may be determined such that, of the force acting on the engaging protrusion 29 when the card member 3 is moved in the extracting direction and inner wall face of the engaging indention 13 abuts against the engaging protrusion 29, the magnitude of the force acting in the direction to disengage the engaging protrusion 29 from the engaging indention 13 is less than the magnitude of the force acting in the direction of extraction of the card member 3, thereby enabling the slider 7 to catch the card member 3. The angle θ2 formed by the top protruding piece 29b of the engaging protrusion 29 and the extending direction of the base of the oscillating member 27 is greater than 90° degrees but not greater than 180° degrees.

As shown in FIG. 4b, at the tip of the oscillating member 27 is provided a cam protrusion 31 which is bent upwards, that is in a direction substantially rectangular to the direction in which the slider 7 extends. The cam protrusion 31 projects through a hole 33 cut out in the side wall of the slider 7 as shown in FIG. 4a. Inside the step 25 shown in FIG. 4b, a leaf spring 35 is installed so as to apply force on the cam protrusion 31 towards the front end thereof. The front end of this leaf spring 35 abuts against the rear end of the cam protrusion 31 and applies force thereon. On the right edge of the side wall 37 on the front side is provided a catching step 39 which projects outside. In addition, in the left bottom of the slider 7 is provided a spring installation hole 41 having an opening 41a on the left side wall and extending in the direction in which the slider 7 extends. An upwardly projecting plate-shaped catch 43 is provided on the left-side upper portion of the slider 7.

The slider 7 is arranged in the right-hand side of the card holding member 5 such that the engaging protrusion 9 projects toward the card member 3 and the cam protrusion 31 is placed to project from the back side towards the front side of the plane of FIG. 1. Also, the rear end of the coil spring 45 attached to the right-hand side of the front edge inside the card holding member 5 is inserted into the spring insertion hole 41 in the slider 7.

Next is an explanation of the operation of the card connector 1. In order to seat the card member 3 in the card holding member 5, as shown in FIG. 5a, grasping the base of the card member 3, the card member 3 is inserted into the opening 15 of the card holding member 5 with the card-side terminals 9 facing forward. When the card member 3 is inserted into the opening 15, the side wall in the lower part of the card member 3 comes into contact with and slides along the side wall of the slider 7. As the card member 3 moves the slider 7 towards the card-side terminals 9 it goes over the engaging protrusion 29 and the step 11 of the card member 3 abuts against the catch 43 of the slider 7 so that the card member is held by the slider 7.

FIG. 5b shows the card member 3 positioned in the slider 7. As seen in FIG. 5b, the engaging protrusion 29 of the oscillating member 27 is positioned in the term of vertical direction such that it is capable of free movement at point A (the position where the card member 3 can be inserted into or extracted from the card holding member 5, and this position is referred to as "the insertion/extraction allowing position") and the extent of the projection of the engaging protrusion 29 into the engaging indention 13 is very small. The outside shape of the step 11 of the card member 3 is a circular arc. Furthermore, the top protruding piece 29b of the engaging protrusion 29 is considerably inclined to the left side. Therefore, when the card member 3 is inserted into the card holding member 5 and the arc shaped leading edge of the card member 3 abuts against the top protruding piece 29b, the oscillating member is caused to oscillate downwards and the top protruding piece 29b moves downwards. As a result of this, the card member 3 can easily be inserted into the specific position in the slider 7, and the card member 3 is held by the slider 7 due to the return of the top protruding piece 29b.

Figure 6:
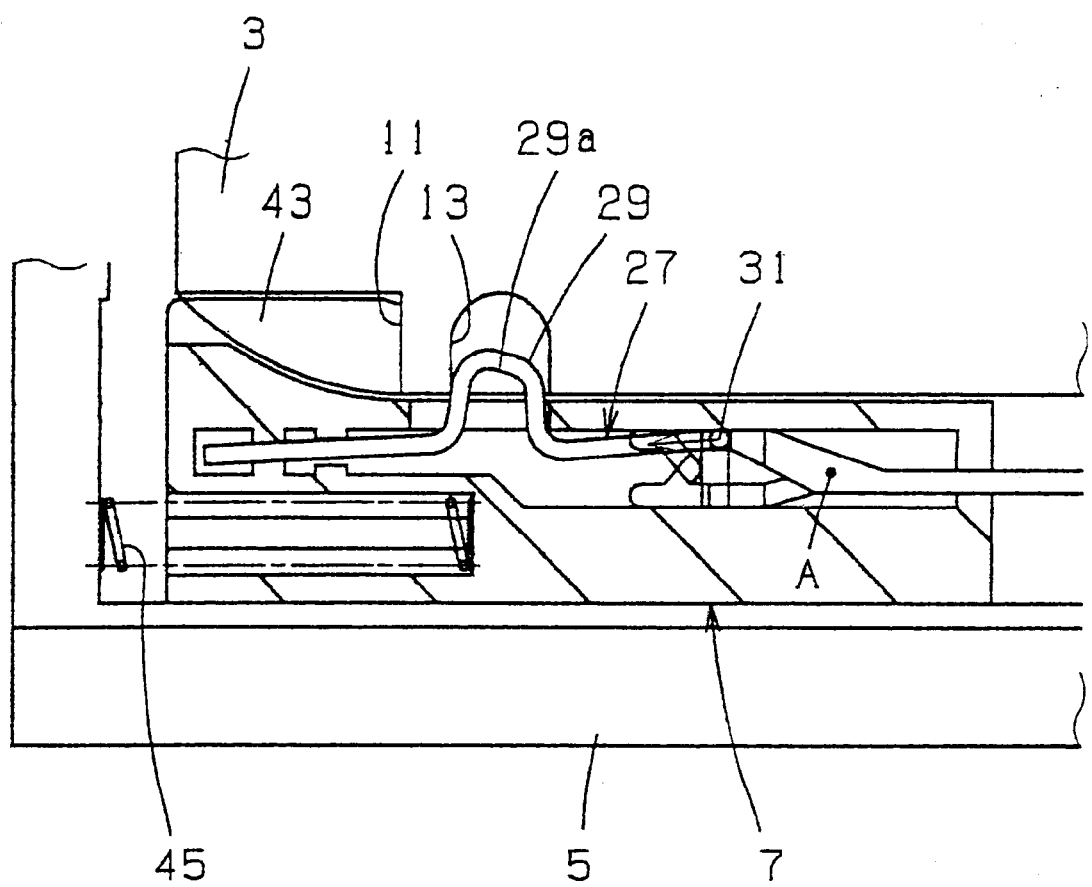
FIG. 6 is a diagram for explaining the actions of the card connector according to an embodiment of the invention.

When the card member 3 is pushed toward the leading edge thereof from the insertion/extraction allowing position as illustrated in FIG. 5b, the slider 7 moves to the leading edge side, resisting the force applied by the coil spring 45 as shown in FIG. 6. Simultaneously, the cam protrusion 31 moves from point A to point D as shown in FIG. 3b and causes the oscillating member 27 to oscillate upwards as in FIG. 6, so that the extent of the protrusion of the engaging protrusion 29 into the engaging indention 13 is increased to ensure engagement between the card member 3 and the slider 7. At this point, the card member 3 approaches the mother-apparatus-side terminals 17, and the card-side terminals 5 and the mother-apparatus-side terminals 17 are electrically connected, resisting the friction therebetween.

Figure 7A:
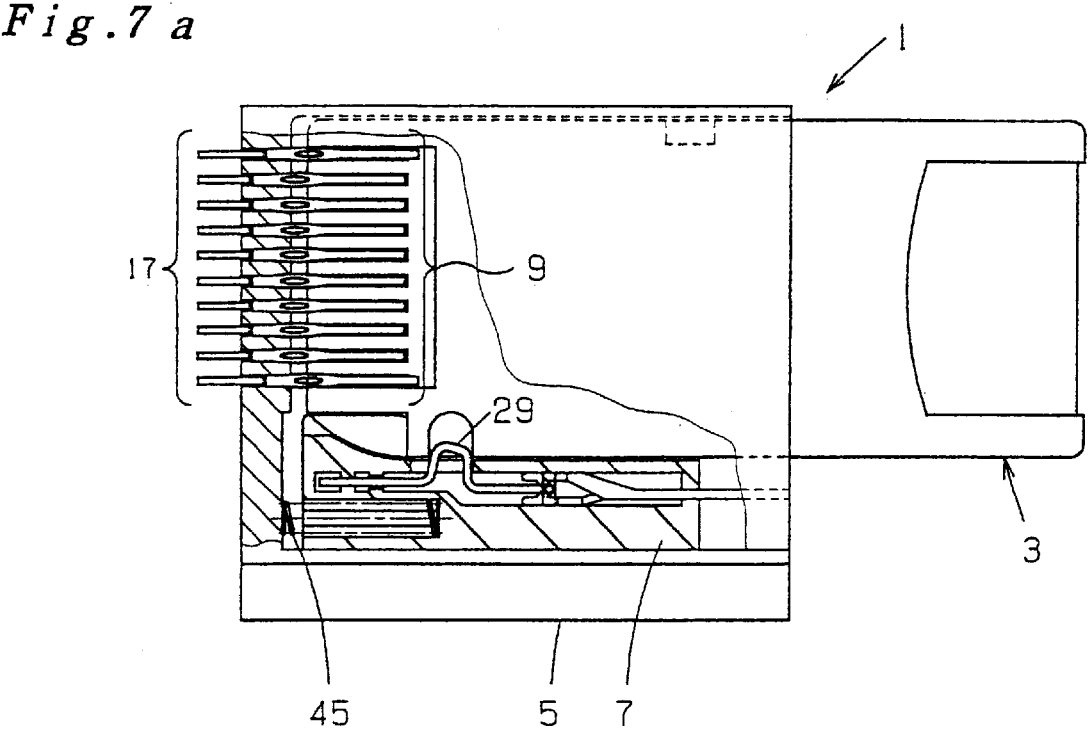
FIGS. 7a and 7b are diagrams for explaining the actions of the card connector according to an embodiment of the invention.
Figure 7B:
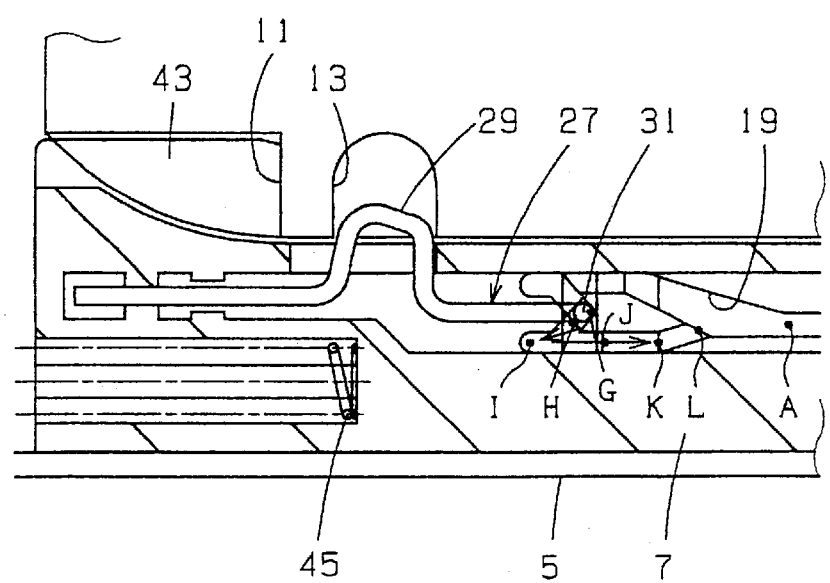

When the cam protrusion moves from point D to point E as shown in FIG. 3a, the movement of the cam protrusion 31 becomes restricted and the movement of the card member 3 due to the pressure applied thereon is stopped. By this mechanism, when the pressure on the card is released, the cam protrusion 31 moves to and stops at point G as shown in FIG. 7b by the force applied by the coil spring 45 as shown in FIG. 7a. In greater detail, as shown in FIG. 3a and FIG. 3b, when the cam protrusion 31 moves to point E and the pressure on the card member is nullified, the cam protrusion 31 moves from point E to point D, but as point D defines a step projecting upwards, the cam protrusion 31 cannot move further from point D to point C. The cam protrusion 31 instead moves towards point F, then moves to and stops at point G where the groove is deeper than at point F. Consequently, the card member 3 is held in the card holding member 5 with the card-side terminals 9 connected to the mother-apparatus-side terminals 17 as shown in FIG. 7a. The position at point G where the card member 3 is held in the card holding member 5 with the card-side terminals 9 being in contact with the mother-apparatus-side terminals 17 as in FIG. 7b shall henceforth be referred to as the "contact position."

Next, in order to extract a card member 3 in the connected position from the card holding member 5, the card member 3 as shown in FIG. 3 is pressed towards the mother-apparatus-side terminals (the card insertion direction). When the card member 3 is pushed in such a manner, as there is a step at point F, the cam protrusion 31 passes point G, then point H and reaches to point I, as shown in FIG. 7b, where the movement is restricted. Then, when the operation to press the card member 3 is stopped at point I, the slider 7 is moved in the direction away from the mother-apparatus-side terminals 17 (the card extraction direction) due to the force applied by the coil spring 45, and the cam protrusion 31 moves from point I past points K and L and stops at point A, that is the insertion/extraction allowing position.

Here, when the cam protrusion 31 returns to the insertion/extraction allowing position or point A and stops there, the inner wall face 13a of the engaging indention 13 abuts against the left-side protruding piece 29a of the engaging protrusion 29 as seen in FIG. 5b. At this point, of the force acting on the left-side protruding piece 29a, the magnitude of the force acting in the direction to disengage the engaging protrusion 29 from the engaging indention 13 is smaller than the force acting in the direction to extract the card member 3. Therefore, even though the oscillating member 27 is in a free state, there is hardly any downward oscillation of the oscillating member 27, and the engaging protrusion 29 does not move in the direction of disengagement from the engaging indention 13. With this type of construction, the state in which the card member 3 is held in the slider 7 at the insertion/extraction allowing position is maintained, thereby preventing the card member 3 from plunging out of the card holding member 5.

However, the extent in which the engaging protrusion 29 projects into the engaging indention 13 is small. Therefore, the card member 3 can easily be removed from the card holding member 5 when the card member 3, which is in this insertion/extraction allowing position, is grasped and pulled by hand.

Even if the tip of the slider 7 moves close to the opening 15 of the card holding member 5 when the card member 3 is removed as mentioned above, the catch 39 provided on the slider 7 as shown in FIG. 4a abuts against the catching protrusion 23a of the catch 23 provided on the card holding member 5 as shown in FIG. 2b and stops the slider 7 so that the slider 7 does not fall out of the card holding member 5.

In the embodiment of the invention described above, the cam protrusion 31 protrudes perpendicularly to and upward from the plane of FIG. 1, and the cam groove 19 is provided on the inside of the side face of the card holding member 5 positioned in opposition to the tip of the cam protrusion 31, but possible embodiments are not limited to this arrangement. It is also possible that the cam protrusion 31 protrudes perpendicularly to and downward from the plane of FIG. 1 and the cam groove 19 is provided on the inside of the side face of the card holding member 5 positioned in opposition to the tip of the cam protrusion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A card connector comprising:

a card member having card-side terminals;

a card holding member which has mother-apparatus-side terminals to be connected with the card-side terminals, is capable of accommodating the card member such that the card member can be inserted therein and extracted therefrom, and is constructed such that, when the card member is seated inside the card holding member, the mother-apparatus-side terminals are in contact with the card-side terminals to establish an electrical connection therebetween;

a slider which is installed in the card holding member so as to be movable in the direction of insertion and extraction of the card member and which moves in the direction of insertion and extraction along with the insertion and extraction of the card member;

an engaging mechanism which is provided between the slider and the card member for engaging the card member with the slider; and a cam mechanism which is provided between the slider and the card holding member, and which, in response to the operation of pushing in the card member, positions and holds the slider in the contact position where the card member is held by the card holding member with the card-side terminals being in contact with the mother-apparatus-side terminals, and in the insertion/withdrawal allowing position where the card member can be inserted into or extracted from the card holding member;

wherein the cam mechanism is composed of a cam protrusion that protrudes from a cam member provided in the slider and of a cam groove that is formed on the internal wall of the card holding member in opposition to the cam protrusion so as to hold the card member in the contact position and in the insertion/withdrawal allowing position; and the engaging mechanism is composed of an engaging protrusion provided in the slider and of an engaging indention formed on the wall face of the card member in opposition to the engaging protrusion so as to engage with the engaging protrusion.

2. A card connector according to claim 1, wherein the cam groove is a heart-shaped cam groove having two projections at the leading end, which come together at the rear end thereof and further extend towards the opening.

3. A card connector according to claim 1, wherein the engaging protrusion is shaped such that, of the force acting when the internal wall face of the engaging indention abuts against the engaging protrusion after being moved in the direction in which the card member is extracted, the magnitude of the force acting in the direction to disengage the engaging protrusion from the engaging indention is smaller than the magnitude of the force acting in the direction to extract the card member.

4. A card connector according to claim 1, wherein the cam mechanism has an oscillating member, one end of which is attached to the inside of the slider, while the other end of which is able to freely oscillate in the direction of the thickness as well as in the direction of the width of the card holding member, and said freely oscillating end of the oscillating member forms the cam protrusion, while the mid section of the oscillating member forms the engaging protrusion.

5. A card connector according to claim 4, wherein the cam protrusion formed by the freely oscillating end of the oscillating member projects into the cam groove; and when the slider moves from the insertion/withdrawal allowing position to the contact position, the cam protrusion is moved along the cam groove in the direction to approach the card member, and the engaging protrusion formed on the mid section of the oscillating member projects into the engaging indention formed on the wall face of the card member, whereby the engaging protrusion is solidly engaged with the card member.

6. A card connector according to claim 5, wherein, when the slider moves from the contact position to the insertion/withdrawal allowing position, the cam protrusion is moved along the cam groove, first in the direction away from the card member to cause the engaging protrusion to come out of the engaging indention; and the cam protrusion is then gently moved in the direction to approach the card member and, in the insertion/withdrawal allowing position, the engaging protrusion projects slightly into the engaging indention so that the engaging protrusion gently engages with the card member.

* * * * *